(12) United States Patent
Dearn et al.

(10) Patent No.: US 10,175,822 B2
(45) Date of Patent: Jan. 8, 2019

(54) OPTICAL TOUCH SCREEN WITH A LOSSY DISPERSIVE FTIR LAYER

(71) Applicant: T-Phy Ltd., Leeds (GB)

(72) Inventors: David Dearn, Malmesbury (GB); David Lomas, Swindon (GB)

(73) Assignee: T-Phy Ltd., Leeds (GB)

( * ) Notice: Subject to any disclaimer, the term of this patent is extended or adjusted under 35 U.S.C. 154(b) by 115 days.

(21) Appl. No.: 15/303,247

(22) PCT Filed: Apr. 1, 2015

(86) PCT No.: PCT/GB2015/051016
§ 371 (c)(1),
(2) Date: Oct. 11, 2016

(87) PCT Pub. No.: WO2015/155508
PCT Pub. Date: Oct. 15, 2015

(65) Prior Publication Data
US 2017/0031527 A1    Feb. 2, 2017

(30) Foreign Application Priority Data

Apr. 11, 2014  (GB) .................................. 1406550.2
Jan. 15, 2015  (GB) .................................. 1500652.1

(51) Int. Cl.
*G06F 3/041*   (2006.01)
*G06F 3/042*   (2006.01)
*G06F 3/038*   (2013.01)

(52) U.S. Cl.
CPC .......... *G06F 3/0418* (2013.01); *G06F 3/0386* (2013.01); *G06F 3/042* (2013.01);
(Continued)

(58) Field of Classification Search
CPC . G06F 2203/04101; G06F 2203/04104; G06F 2203/04109; G06F 3/0386;
(Continued)

(56) References Cited

U.S. PATENT DOCUMENTS

| 6,501,846 B1 | 12/2002 | Dickinson et al. |
| 2004/0189621 A1 | 9/2004 | Cho et al. |

(Continued)

FOREIGN PATENT DOCUMENTS

| CN | 102096620 A | 6/2011 |
| JP | H0511909 A | 5/1993 |

(Continued)

*Primary Examiner* — Afroza Chowdhury
(74) *Attorney, Agent, or Firm* — Boyle Fredrickson, S.C.

(57) ABSTRACT

A touch sensitive screen arrangement includes an optically dispersive base plate and structures for transmitting light onto the base plate in response to an external body touching the screen at a touch point such that the location of incident light on the surface of the base plate is representative of the relative position of the touch point on the screen. The base plate captures and disperses light that is incident on it. The decrease in incident light intensity with distance from the location of incidence on the base plate approximates a substantially exponential function. A sensor detects intensity of light at a respective edge of the base plate. The arrangement calculates the relative position of the touch point on the screen from the detected light intensity and the exponential function and generates a control signal representative of a control input derived from the position of the touch point.

13 Claims, 10 Drawing Sheets

(52) U.S. Cl.
CPC .......... *G06F 3/0416* (2013.01); *G06F 3/0421*
(2013.01); *G06F 2203/04101* (2013.01); *G06F 2203/04104* (2013.01); *G06F 2203/04109* (2013.01)

(58) Field of Classification Search
CPC ...... G06F 3/0416; G06F 3/0418; G06F 3/042; G06F 3/0421
See application file for complete search history.

(56) References Cited

U.S. PATENT DOCUMENTS

| | | | |
|---|---|---|---|
| 2009/0322677 A1* | 12/2009 | Lee | G06F 3/0421 345/158 |
| 2012/0229422 A1 | 9/2012 | Hwang et al. | |
| 2013/0181896 A1 | 7/2013 | Gruhlke et al. | |
| 2014/0055418 A1 | 2/2014 | Hsieh et al. | |

FOREIGN PATENT DOCUMENTS

| | | |
|---|---|---|
| JP | 2005316517 A | 11/2005 |
| WO | 2008/018768 A1 | 2/2008 |
| WO | 2013/179168 A1 | 12/2013 |

\* cited by examiner

Light propagation in a lossy plate with scatter's compared to a relatively transparent plate

Fig. 4

Fig. 5 a) Initial press location for proposed "lossy" plate (Note $d_1/d_2$ = constant b) Prior art press location for clear plate (e.g. WO2008/018768)
(Note $d_1/d_2$ = constant)

Comparing algorithm for initial press detection of a lossy plate with prior art for a clear plate

Fig. 6

One embodiment showing angular sensitivity of the optical detector with radial distance

OPTICAL TOUCH SCREEN WITH A LOSSY DISPERSIVE FTIR LAYER

BACKGROUND OF THE INVENTION

1. Field of the Invention

This invention relates to an optical touch sensitive screen for an electronic device, such as a smartphone, tablet, laptop, e-reader or handheld gaming device.

2. Discussion of the Related Art

The provision of touch sensitive screens for electronic devices is becoming increasingly widespread. Conventional touch screen arrangements may comprise an LCD display surface and a resistive or capacitive overlay that is placed over the LCD display surface. In a resistive touchscreen, when pressure is applied to the LCD display surface, via the overlay, electronic signals representative of the relative location of such pressure, are generated by a controller IC and a device driver, or similar, in the host computing device interprets such signals as touch-based inputs, such as a key press or scroll action. Similarly, in a capacitive touchscreen, disturbance in the electric field, created in the overlay, is used to determine the touch action(s).

Resistive touch screens are particularly favoured for many applications in view of their low cost, low power consumption and stylus support. Resistive touch screens generally comprise conductive and resistive layers, separated by thin spaces. When a pointer, such as a finger or stylus, touches the screen and applies pressure thereto, contact is made between the layers, thereby effectively closing a switch and causing current to flow. A controller determines the current between layers to derive the position of the touch point.

However, there are a number of disadvantages associated with resistive touch screens. Firstly, as a result of the overlay, the screens are not fully transparent, and are generally not readable in direct sunlight. Secondly, such screens are subject to deterioration of the pressure sensitive layers, and also require periodic re-calibration. Furthermore, pressure is required to be applied for detection: thus, if insufficient pressure is applied by a pointer, it will go undetected. Finally, resistive touch screens are unable to discern that two or more pointers are touching the screen simultaneously, a function known as "multi-touch".

SUMMARY OF THE INVENTION

The present invention seeks to address at least some of these issues and provide an improved touch screen in terms of cost and reliability.

In accordance with an aspect of the present invention, there is provided a touch sensitive screen arrangement comprising a screen including an optically dispersive and lossy base plate, and means for transmitting light onto said base plate in response to an external body touching said screen at a touch point such that the location of incident light on the surface of said base plate is representative of the relative position of said touch point on said screen, wherein said base plate is configured to both capture and disperse and subsequently lose the energy of the light incident thereon, using well controlled mechanisms of spreading and energy loss. The optically dispersive characteristic of said base plate being such that the decrease in intensity of said incident light with distance from said location of incidence on said base plate surface approximates a substantially exponential function, the arrangement further comprising at least one sensor for detecting intensity of light at a respective edge of said base plate, and processing means for calculating the relative position of said touch point on said screen from said detected light intensity and said exponential function and generating a control signal representative of a control input derived from said position of said touch point.

In accordance with one exemplary embodiment of the invention, the arrangement may comprise at least two sensors for detecting intensity of light at respective edges of said base plate, and the optically dispersive and lossy characteristic of said base plate may be such that the intensity ratio of light detected by said sensors approximates a substantially exponential function including an element representative of the difference between the respective distances of said sensors from said location of incidence of light on said base plate surface. In this case, the optically dispersive and lossy characteristic of said base plate may be such that said intensity ratio is defined by a substantially constant difference in respective distances of said sensors from said location of incidence of light on said base plate surface, irrespective of the relative position of said touch point.

The base plate may comprise an optically transparent substrate doped with optically refractive and/or reflective particles or molecules. In this case, the gradient of said exponential function may be dependent on the level of doping of said base plate with said optically refractive and/or reflective particles or molecules.

The processing means may be configured to adjust said relative position calculation to take into account angular sensitivity of said sensor(s).

In accordance with an exemplary embodiment of the invention, the screen may further comprise an optically transparent top plate, spaced apart from said base plate with a substance therebetween, and the arrangement may further comprise a light source configured to illuminate said top plate such that said illuminating light is substantially totally internally reflected within said top plate when no external body is touching said screen. In this case, the refractive index of the substance between the top plate and the base plate will be less than the refractive index of the optically dispersive top plate. For example, the substance between said top plate and said base plate may be air.

The light source may be located at an edge of said top plate and configured to illuminating said top plate with a ray of light at a predetermined angle of incidence with respect to the top plate surfaces, wherein said angle of incidence and the refractive indices of said top plate and the substance between said top plate and said base plate may be such that said illuminating light is substantially totally internally reflected within said top plate when no external body is touching the screen.

In accordance with another exemplary embodiment of the invention, the arrangement may comprise a stylus including a light source at an end thereof and configured to transmit light from said light source to said base plate at a touch point on said screen.

In this case, the screen may further include an optically transparent top plate, spaced apart from said base plate with a substance therebetween, and the arrangement may further comprise a light source configured to illuminate said top plate with a modulated optical signal. The stylus may include a photo detector for detecting said modulated optical signal, thereby enabling two-way communication between said stylus and said screen.

The processing means may be configured to calculate said relative position of said touch point by means of a hyperbolic intersection algorithm.

BRIEF DESCRIPTION OF THE DRAWINGS

These and other aspects of the present invention will become apparent from the following description in which embodiments of the present invention are described by way of examples only and with reference to the accompanying drawings, in which.

DETAILED DESCRIPTION

Figure 1:
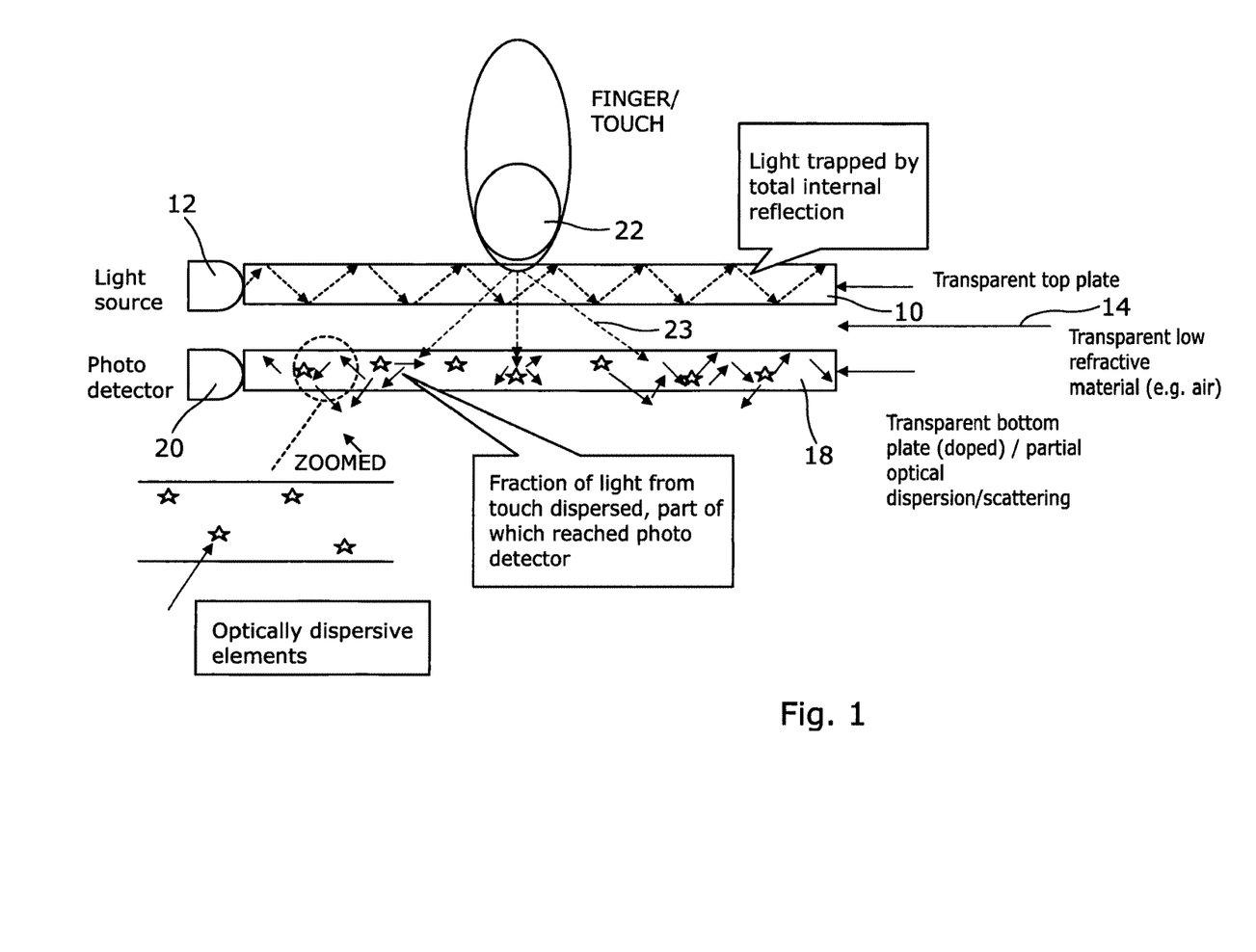
FIG. 1 is a schematic cross-sectional view of a touch screen arrangement according to a first exemplary embodiment of the present invention.

Referring to FIG. 1 of the drawings, a touch screen arrangement according to a first exemplary embodiment of the present invention comprises an optically transparent top plate 10 and one or more light sources 12 located at an edge or multiple edges thereof. The top plate 10 may be formed of any optically transparent material, such as glass or acrylic, and the invention is not intended to be in any way limited in this regard. The light source may comprise an LED or other known light source, as will be apparent to a person skilled in the art. A lens (not shown) may be provided between the light source 12 and the edge of the top plate 10, if required, in order to focus and/or laterally spread the illuminating light. The light source may comprise infrared or intensity modulated such that the arrangement works effectively in bright ambient conditions. A plurality of light sources may be provided, in which case, by uniquely modulating each light source, the ability to accurately detect touch position can be enhanced.

It will be appreciated that the greater the intensity of light, the higher will be the signal-to-noise ratio and, therefore, the accuracy of the result. However, the power consumption is directly proportional to the intensity of the signal. Thus, by adjusting the mark space ratio of the modulated signal, and/or by bursting the modulation, and/or by altering the currents in the light source(s), at appropriate times (e.g. during a pre-touch detection phase), the electrical efficiency can be enhanced whilst optimising the signal-to-noise ratio of the system. Further enhancements to the system may be achieved by dynamically adjusting some light levels at selected areas of the screen, whilst reducing others. For example, when a touch has been detected, and its position is known, the brightness in that area can be increased, to permit tracking of the touch, whilst the brightness in other areas of the screen can be reduced to save power.

Located below the top plate 10, there is an optional middle layer 14 having a refractive index which is less than that of the optically transparent plate. In the example shown, the middle layer 14 is comprised of air, but the substance used for the middle layer 14 is only constricted by the requirement that it have a lower refractive index than the material used for the top plate 10, and the present invention is not intended to be limited in any further way in this regard.

The top plate 10 is illuminated by the light source(s) 12 so as to cause total internal reflection of the light within the top plate 10. Total internal reflection is a phenomenon that occurs when an incident light wave strikes a medium boundary at an angle larger than a particular critical angle with respect to the normal of the surface. If the refractive index is lower on the other side of the boundary and the incident angle is greater than the critical angle, the light cannot pass through the boundary and is entirely reflected within the medium.

In the event that a pointer, such as a finger or stylus 22 touches the top plate 10, the total internal reflection within the top plate 10 is interrupted, by means of frustrated total internal reflection (FIR), causing some light 23 to be transmitted through the plate 10 and the middle layer 14. Increased pressure from a pliable pointer, such as a finger, causes a greater area of totally internally reflected light to be interrupted, increasing the degree of frustrated interference and, to an extent, mimicking the shape of the object touching the screen Thus, the shape of the pointer could be used to perform other actions: for example, once a finger touch has been detected and its shape determined, actions could be performed by rotating the finger on the screen, which change of shape would be detectable and therefore actionable.

The touch screen arrangement of the first exemplary embodiment of the present invention further comprises an optically dispersive and lossy bottom plate 18 and a photo detector 20 located at an edge thereof. The bottom plate 18 has a dispersive property which causes light incident thereon from above to be dispersed towards its edges, as well as being lost from the upper and lower surfaces of this plate, in such a manner as to form a dominantly lossy plate. Such dispersive property can be achieved in a number of different ways, as will be apparent to a person skilled in the art. For example, the plate 18 may have therein embedded microscopic optically refractive and/or or reflective particles or molecules 18a. Such molecules will cause light incident thereon to be refracted and/or reflected and consequently scattered within the bottom plate 18, thereby causing scattering/loss and spreading out of the light across the plate 18 toward the edges, (as well as causing light to be lost through the upper and lower surfaces of this plate) such that it can be detected by the photo detector 20. Other methods of providing the bottom plate 18 with similar dispersive and lossy properties may include coating the bottom plate 18 with a diffracting/dispersive substance, or surface patterning, as will be apparent to a person skilled in the art.

Thus, when a pointer (such as a finger, stylus, etc.) 22 touches the top plate 10 and light is thus caused to pass through the top plate 10 and the middle layer 14 to the bottom plate 18, its dispersive/lossy properties cause the light incident thereon from above to be dispersed and scattered in a lossy manner, as previously described, through the plate 18 toward the edges, such that part of said light is detected by the photo detector 20. It will be appreciated that the location at which the top plate 10 is touched will determine the relative location on the bottom plate 18 at which light is incident and, therefore, the distance of said incident light from the edges of the bottom plate 18 (i.e. the distance over which light needs to travel to reach the photo detector edge). As a result, the relative amount of light detected by the photo detector will be entirely dependent on the location at which the top plate 10 is touched and, therefore, the location on the bottom plate 18 at which light is incident.

It will be appreciated that the scattering/dispersive property of the lossy bottom plate increases the amount of light captured by the plate and also the manner in which it is dispersed and attenuated in the lateral direction. Thus, this property may be used to control the behaviour of the attenuation of the captured light with distance from the originating touch, so that the location of the touch point can be uniquely calculated, and accuracy of the position of touch controlled. It is also desirable to control the profile of the attenuated captured light with distance by controlling the profile of the concentration of the scattering/dispersive material embedded in the bottom plate 18.

In any event, processing means (not shown) are provided for receiving data from the photo detector(s), representative of the amount and intensity of light detected thereby and, therefore, calculates the location on the top plate 10 of the touch point and the nature and/or shape of the touch. Thus, by comparison of relative intensity at each photodiode, and their relative locations, as well as knowledge of the dispersive and attenuative properties of the bottom plate 18, it is possible to calculate the position and nature of a touch or even multiple touches. A device driver (not shown) will then be able to interpret the resultant data as a touch-based input, such as key press or scroll action.

Thus, in accordance with an exemplary embodiment of the present invention as described above, there is provided a touch sensitive top screen, wherein light injected into the edges of this top plate, is contained by phenomena of total internal reflection (TIR). Touching the surface of this top plate releases a small proportion of this light by a phenomenon of "evanescence" or frustrated internal reflection (FIR). It will be appreciated that the proportion of fight emitted by frustrated internal reflection comprises a very small fraction of the light in the top plate.

This small percentage of light released from the top plate light is then directed onto a bottom plate, which is deliberately doped with reflective/refractive particles, in order to make it very lossy with respect to light travelling along its length. In addition only a small percentage of light emitted from the top plate is initially captured in the bottom plate. The bottom plate is so heavily doped, that in the lateral direction the plate is close to opaque. Sensors at the edges of the bottom plate detect this small percentage of light that reaches the edges and as will be shown in the following discussions, converts this into positional information.

Next, the operation of the top and bottom plate and the technique for detecting the position of the touch will be described in detail.

The use of evanescent light emitted by FIR when touched, has several advantages compared with prior art techniques such as "beam breaking", or detection of diffused light being reflected by the hand or finger. These advantages include, but are not limited to, clearer detection of when the finger or stylus touches the screen, (rather than being slightly above it), as well as, at least to some extent, an indication of the variation in touch pressure. A further advantage is cost, due to the potential for a reduced number of light sources and sensors.

The use of evanescent light emitted by FIR when touched has been the subject of some investigation, either where cameras are used directly to image this emitted light, or where such light is redirected to an array of detectors at the side of the screen, in order to image the position. However, one of the principal novel features of embodiments of the present invention is the use of the evanescent light emitted by FIR when a top plate is touched and the deliberate use of this in conjunction with a lossy plate underneath in order to calculate the position, without the need for a matrix of sensors to directly image the position of the touch. Specifically the lossy plate is doped to give the required coefficient of loss necessary for a given touch resolution at a maximum defined distance, in a given bandwidth/response time.

With the small light levels emitted from the evanescent press, which are orders of magnitude smaller than that of, for example laser pointers, and given that only a tiny percentage of this light is captured by the lossy lower diffusing plate, it may seem counter intuitive to use a lower plate that typically transmits only a few percent of the light incident to the edges to be detected. However, the inventors have developed a novel approach for accurate touch detection.

When considering the signal that is detected by the optical detectors, it is a clearly known phenomenon that electrical random noise will always be present, in both the sensors and any amplifying/detection circuitry. This noise will create an uncertainty in the positional accuracy of the press depending upon the characteristics of the signal with respect to position. Of course the signal may be averaged or filtered or otherwise processed to reduce the effect of noise, but this will have the well known effect of reducing the bandwidth, and increasing the time for detecting an accurate position of press.

The use of a lossy plate to detect position addresses this need to achieve a certain positional accuracy within a given bandwidth/time. It can now be seen that the lossy plate has the distinct advantage of losing energy with distance in a controlled manner, and so gives a greater accuracy in distance for a given noise level.

The mathematical analysis of positional accuracy for a given noise level is described in detail below.

Relationship between slope of intensity versus distance and positional accuracy for a given noise level:

We know that in a lossy plate the intensity of light received by an opto sensor can be related to the distance by an equation:

$$I = I_0 e^{\frac{-x}{K_L}}, \qquad \text{equation (a)}$$

where l is the intensity of light at the opto sensor, $l_0$ is the extrapolated light intensity where it is injected into the plate, $K_L$ is a constant which as explained depends upon doping concentration, and x is the distance from the point of injection of the light to the opto sensor.

Differentiating this we get $$\frac{dI}{dx} = \frac{I}{K_L}$$

Hence:

$$dI = dx \cdot \frac{I}{K_L} \qquad \text{equation (b)}$$

Now if we define $1_N$ as the input referred noise current rms/√Hz, and B as the effective bandwidth of the system, then we have $dI=1_N*\sqrt{B}$.

Figure 8:
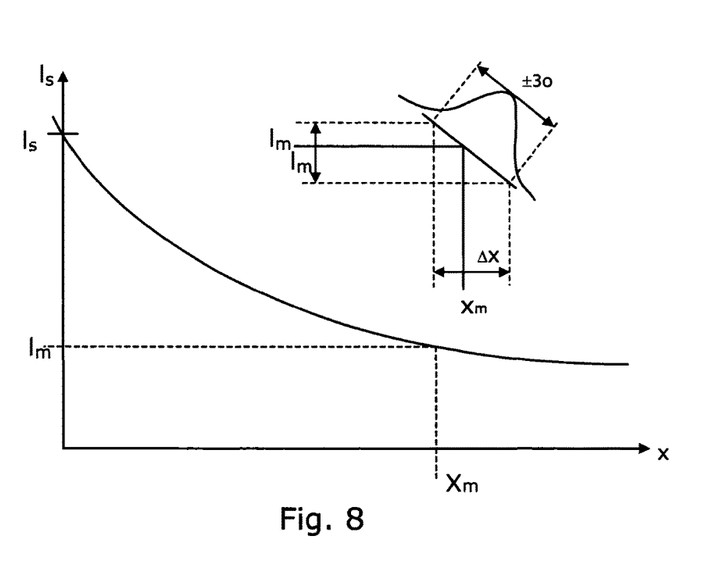
FIG. 8 is a graphical representation of the positional accuracy and input referred optical detection system noise relationship in an exemplary embodiment of the present invention.

Also if we define $\Delta x$ as being the distance uncertainty in ±3 standard deviations (as illustrated in FIG. 8 of the drawings) of the position of the press calculated, which will account for 99.7% of all cases due to the Gaussian nature of the random electronic noise, we can rewrite equation (b) as:

$$\Delta x = \frac{6 \cdot I_N \cdot \sqrt{B} \cdot K_L}{I} \qquad \text{equation (c)}$$

For example in one exemplary embodiment of this invention where $1_N$=250 fA/√Hz, B=10 Hz, $K_L$=22 mm, $1_0$=1997 pA, x=80 mm, giving an accuracy of:

$$\Delta x = +-1 \text{ mm}$$

It should be clearly noted that the transparency of a lossy plate in the vertical direction is similar to that of a lossless plate, due to the thinness of the plates. It is only in the lateral direction that the lossy plate is relatively opaque.

It should be noted that the use of a novel use lossy plate for positional detection is relatively counter intuitive and in complete contrast to the approach taken in prior art arrangements where a low loss contactless screen for use with relatively high brightness laser pointers is envisaged (such as, for example, in WO2008/018768). Such prior art uses a phosphor and deliberately avoids the use of scattering material inside the plate, in order to try and eliminate as much loss inside the plate as possible [35, 97, 161, 39, 54, 90, 99]. An element of aspects of the present invention is to control the loss in the lower plate in order to improve the positional accuracy. This approach has ramifications for the detection algorithm used.

As well as having greater positional accuracy, the use of relatively cheap reflective/refractive particles used for scattering light inside the plate has cost advantages compared with using phosphors' (which emit and then re-radiate the incident light).

Figure 4:
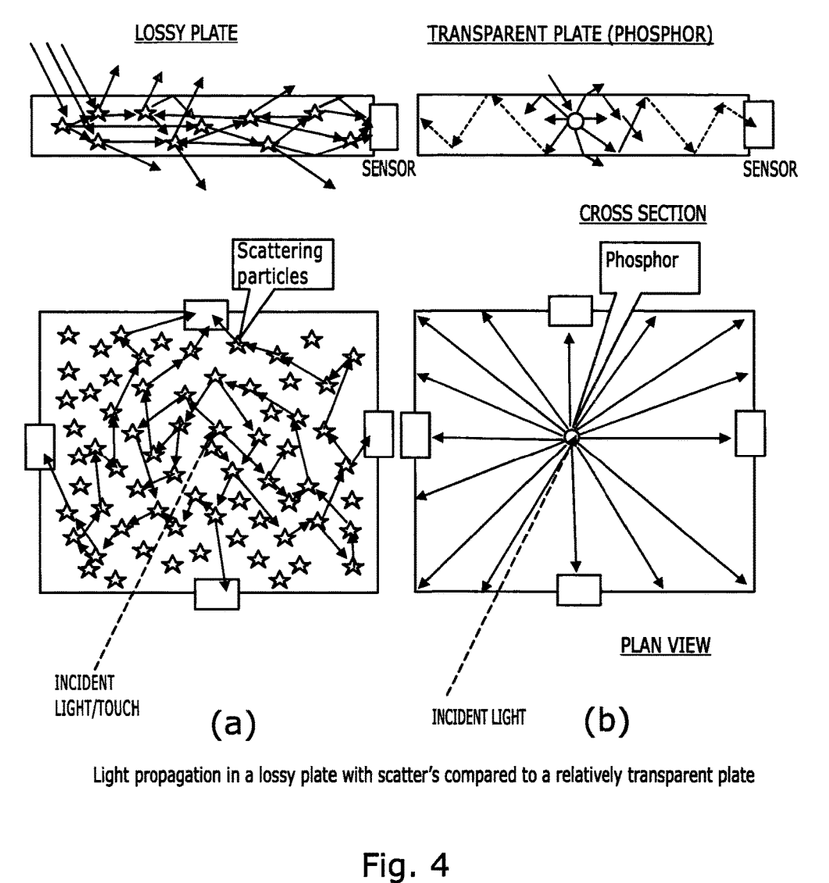
FIG. 4 is a schematic representation of light propagation in (a) a lossy plate with 'scatters' compared to (b) a relatively transparent plate.

The diagram in FIG. 4 exemplifies the difference in modes of operation between a lossy bottom plate which uses scattering and an approach based on a relatively transparent plate using a phosphor.

The use of a lossy bottom plate with scattering particles in the concentrations needed to detect an evanescent press on the top screen can be shown to give a distribution of intensity that is for all practical purposes exponential.

Figure 5:
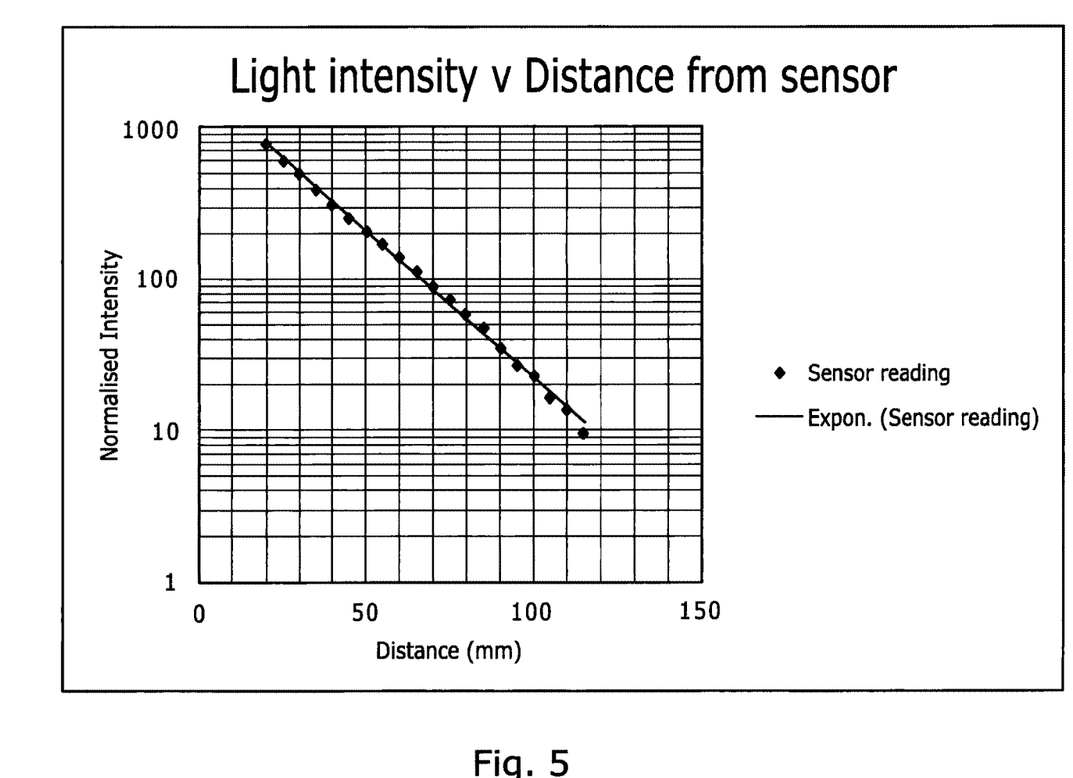
FIG. 5 is a graphical representation of normalised experimental light intensity vs. distance, illustrating the light intensity received by an optical sensor mounted at the edge of a doped lossy plate.

The graph in FIG. 5 shows experimental data taken from such a plate, plotted logarithmically against linear distance. This relationship agrees well with theory.

It should be noted that a novel aspect of this invention is that the concentration and type of dopants used to scatter the light will affect the gradient of this intensity versus distance. This concentration can be deliberately selected, in accordance with aspects of this invention, to achieve the required positional accuracy with a given electronic noise level and a given bandwidth/response time, as has been discussed above.

Thus, a novel aspect of exemplary embodiments of the present invention is the manner in which the characteristics of this lossy plate are utilised to determine the location of the press.

It can be shown that, since the intensity of light in the lossy plate is to all practical purposes exponential, and in which case the intensity can be expressed as in the equation below.

$$I_1 = I_0 \cdot e^{-\frac{d_1}{K_L}} \qquad \text{equ'n 1}$$

Where $1_1$ s the intensity measured at a sensor (1), and $1_0$ is the original intensity of the light captured by the plate, which is at distance $d_1$ from the sensor (1). $K_L$ is simply a constant that determines the slope of the intensity against distance graph (plotted logarithmically)

Using equation 1 above to find the ratio of intensities for two sensors (1 and 2), the following equation results:

$$I_1 = I_0 \cdot e^{-\frac{d_1}{K_L}}. \qquad \text{equ'n 2}$$

Rearranging this by taking natural log of both sides gives $$\ln\left(\frac{I_1}{I_2}\right) = -\frac{(d_1 - d_2)}{K_L} \qquad \text{equ'n 3}$$

It can be seen that if the ratio of signal intensities seen by a pair of sensors ($1_1$ and $1_2$) is measured, and then the path of constant signal ratio on this plate is determined, the path would follow a course where the value of $d_1$-$d_2$ is a constant.

It is known that such a path describes a hyperbola (e.g. reference: http://mathworld.wolfram.com/Hyperbola.html).

This should be contrasted with prior art arrangements (such as, for example, WO2008/018768) which use the fact for a relatively transparent plate a constant ratio of intensities for two sensors yield a constant ratio of distances ("$d_1/d_2$ is a constant") whereas with a lossy plate as described above $d_1$-$d_2$ is a constant and $d_1/d_2$ is not a constant.

Figure 6:
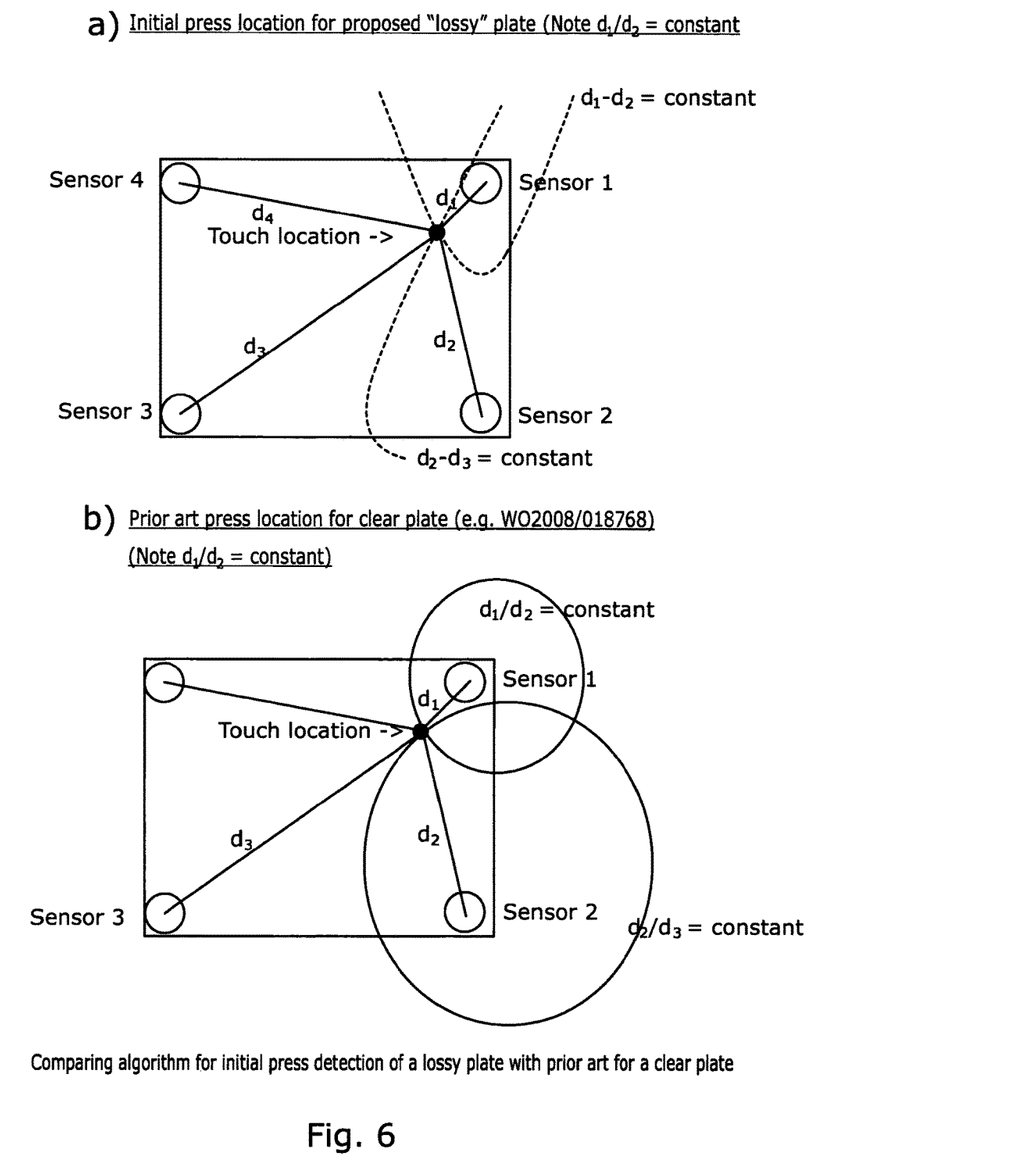
FIGS. 6(a) and 6(b) are schematic diagrams illustrating (a) the described algorithm for initial press detection of a lossy plate in comparison with (b) a prior art method for a clear plate.

Reference is made to FIG. 6 of the drawings to more clearly highlight these differences It should be noted that due to the much more controlled nature of the lossy plate, the distribution of light intensities is well controlled, thus regression analysis (as used, for example, in WO2008/018768), is not required and as previously stated the specific concentration of reflective/refractive/scattering material is chosen to control the positional accuracy with noise.

An algorithm suitable for use in an exemplary embodiment of the invention uses hyperbolic intersections from two pairs of sensors to determine the first approximate position of the press, and this is further processed to account for the finite angular sensitivity of the sensors, as described below.

Determining press position by hyperbolic intersection:

Fundamentals of Hyperbolic Intersection Algorithm

Figure 9A:
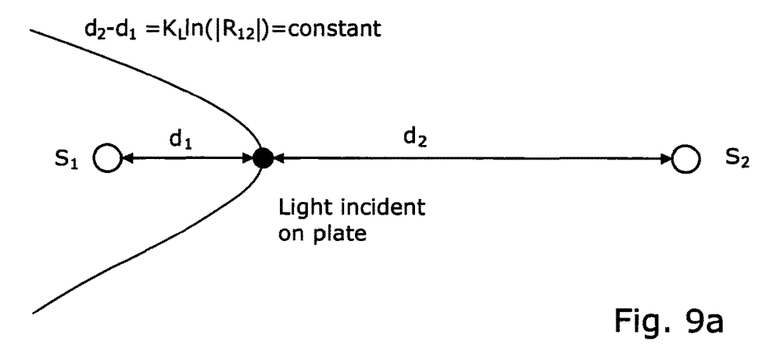
FIG. 9a is a schematic diagram illustrating two opposing sensors in relation to a described hyperbolic intersection algorithm.

Consider two opposing sensors $S_1$ and $S_2$ as shown in FIG. 9a of the drawings.

For an exponential signal intensity wrt distance characteristic, as is the case with the lossy bottom or receiver plate described in the patent then it can been shown that.

$$R_{12} = \frac{I_{S1}}{I_{S2}} = \frac{I_0 e^{\frac{-d_1}{K_L}}}{I_0 e^{\frac{-d_2}{K_L}}}$$

Where lo is the extrapolated intensity of light where it is incident on the plate and $K_L$ is a constant dependent upon the characteristics of the plate.

Hence:

$$R_{12} = e^{\frac{(d_2 - d_1)}{K_L}}$$

And hence:

$$d_2 - d_1 = K_L \ln(R_{12}) \qquad \text{equ'n i}$$

Figure 9B:
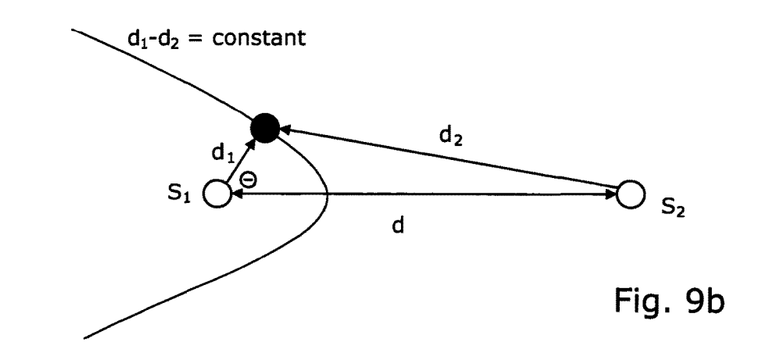
FIG. 9b is a schematic diagram illustrating the sensors of FIG. 9a in relation to the hyperbola shown in polar form.

It can be shown that the path of constant ratio $R_{12}$, is that of a hyperbola shown below in polar form with reference to FIG. 9b of the drawings:

$$d_1 = a \cdot (e^2 - 1)/(1 + e \cdot \cos\Theta), \text{ and } a = (d_2 - d_1)/2, \text{ and } e = d/2a \qquad \text{equ'n ii}$$

Using the results from equ'n i an equ'n ii we get:

$$d_1 = a \cdot (e^2 - 1)/(1 + e \cdot \cos\Theta), \qquad \text{equ'n iii}$$

where $a = K_L \cdot \ln|R_{12}|/2$, and $e = d/(K_L \cdot \ln|R_{12}|)$

It should be clearly noted that by measuring $R_{12}$ the ratio of light intensity between two sensors S1 and S2, and knowing d (the distance between two sensors), and $K_L$ (a property of the plate), a and e can be fully calculated for any pair of sensors.

Figure 10A:
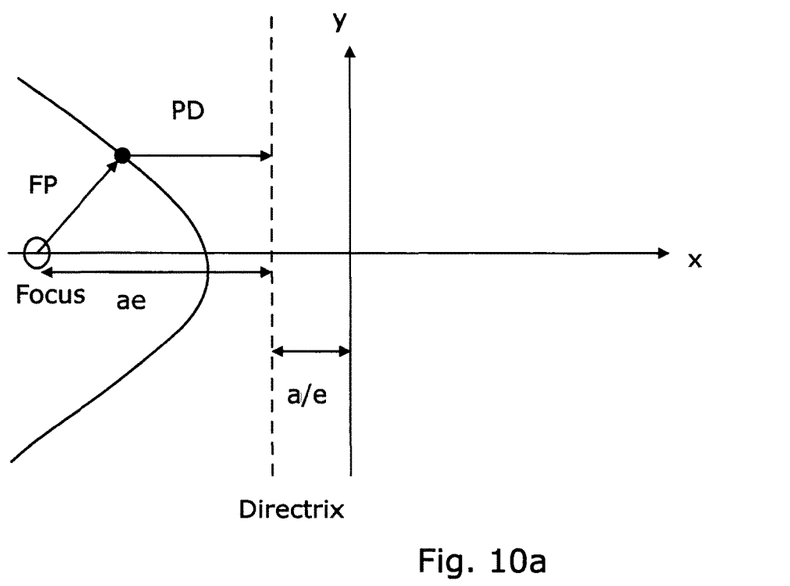
FIG. 10a is a schematic diagram illustrating the known properties of a hyperbola.

Consider known properties of a hyperbola as shown in FIG. 10a of the drawings.

FP=distance from focus to a point on the hyperbola

PD=distance from point on the hyperbola to the directrix

It is a well known property of a hyperbola that $$e = FP/PD \qquad \text{equ'n iv}$$

Figure 10B:
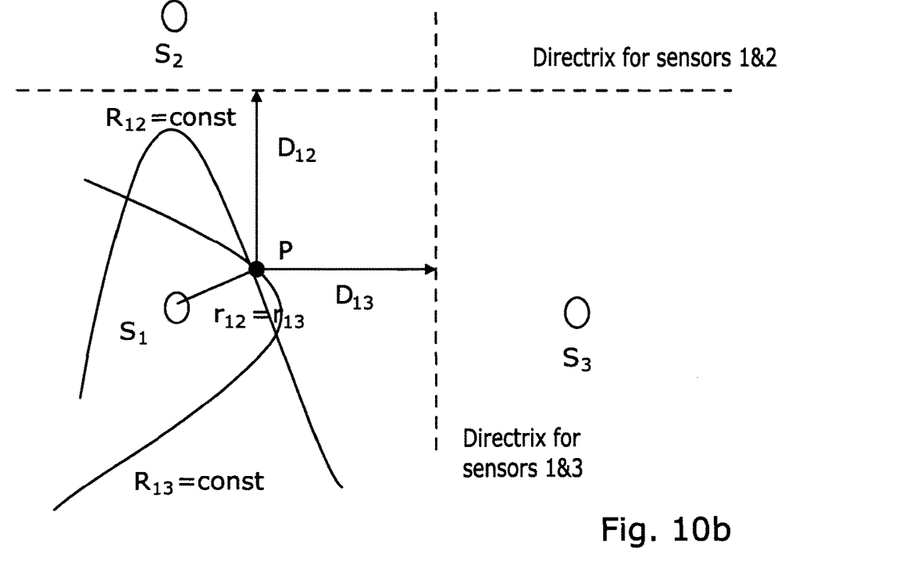
FIG. 10b is a schematic diagram illustrating the case of three sensors which form a right angle.

Now consider three sensors which form a right angle S1, S2 and S3, and which are shown schematically in FIG. 10b of the drawings.

From equ'n iv we can see that:

$$r_{12} = e_{12} \cdot D_{12}$$

And similarly $$r_{13} = e_{13} \cdot D_{13}$$

And since $r_{12} = r_{13}$ $$D_{12}/D_{13} = e_{13}/e_{12} \qquad \text{equ'n v}$$

Now if the press is at cartesian location $(x_p, y_p)$, we know from the properties of the hyperbola shown previously, that $$D_{12} = a_{12} e_{12} - \frac{a_{12}}{e_{12}} - y_p$$

and $$D_{13} = a_{13} e_{13} - \frac{a_{13}}{e_{12}} - x_p$$

Using this in equation (v) we obtain:

$$y_p = \left(\frac{e_{13}}{e_{12}}\right) \cdot x_p + \frac{(a_{12}(e_{12}^2 - 1) - a_{13}(e_{13}^2 - 1))}{e_{12}} \qquad \text{equ'n vi}$$

Where as shown previously $e_{12}$, $e_{13}$, $a_{12}$, $a_{13}$ can all be determined from the ratio of light intensity between pairs of sensors.

A similar equation to that of equ'n vi can be derived using sensors 2, 3 and 4, and another line determined.

The intersection of these two lines is the location of the injection of light into the plate and hence the press location.

The above equation is valid only for pairs of sensors that are at right angles to each other.

A more general equation for sensors A, B, C can be derived and is given by:

$$y_{PABC} = \frac{e_{AB}\cos\varphi - e_{AC}\cos\theta}{e_{AB}\sin\varphi - e_{AC}\sin\theta} x_p + \frac{a_{AC}(e_{AC}^2 - 1) - a_{AB}(e_{AB}^2 - 1)}{e_{AB}\sin\varphi - e_{AC}\sin\theta} \qquad \text{equ'n vii}$$

Where and $e_{xy}$ and $a_{xy}$ have their usual meanings with respect to sensors x and y and $\varphi$ and $\Theta$ are the angles of directricies AB and AC respectively with respect to the vertical Cartesian axes.

Using this approach requires three independent sensors to generate one line and at least two lines to generate an intercept point and hence determine the press location.

However, due to the presence of noise in the system it is advantageous to use multiple sensor combinations in order to improve the overall accuracy of the determined light source, touch press, location.

For a given number of sensors (II), then the number of independent lines is given by L such that:

$$L = n!/(n-3)! \cdot 3!$$

In practice, careful selection of the sensors to be used, for any given region of the screen, can enhance the accuracy of the calculated press location in the presence of noise.

The geometric approach is by no means the only solution to the problem and a solution has also been determined trigonometrically which requires only three sensors to determine a touch location; however this solution is more complex from a calculation perspective and hence does not lend itself to a simple digital implementation.

It should be noted that although in this specific embodiment, the above-described algorithm may be used; the invention is not necessarily intended to be limited in this regard, and multiple ways to determine the position can be considered to be solutions to the multiple simultaneous equations. These can be solved in many ways by those skilled in the art, such as, but not limited to the solving of matrices and/or iterative solutions.

In order to find an accurate position for the press, the finite angular sensitivity of the sensors also needs to be taken into account, since in a real system the optical detectors have a sensitivity that depends upon the angle of incident light arriving at the sensor. Incorporating this phenomenon is a novel aspect of how the algorithm is used. It should be recognised that unlike the relationship of intensity against distance, for the sensor, the relationship of intensity against angle is determined by aspects which may include the design of any light shaping, lensing and/or reflective/refractive surfaces used to guide the light from the edge of the plate to the optical detector.

Figure 7:
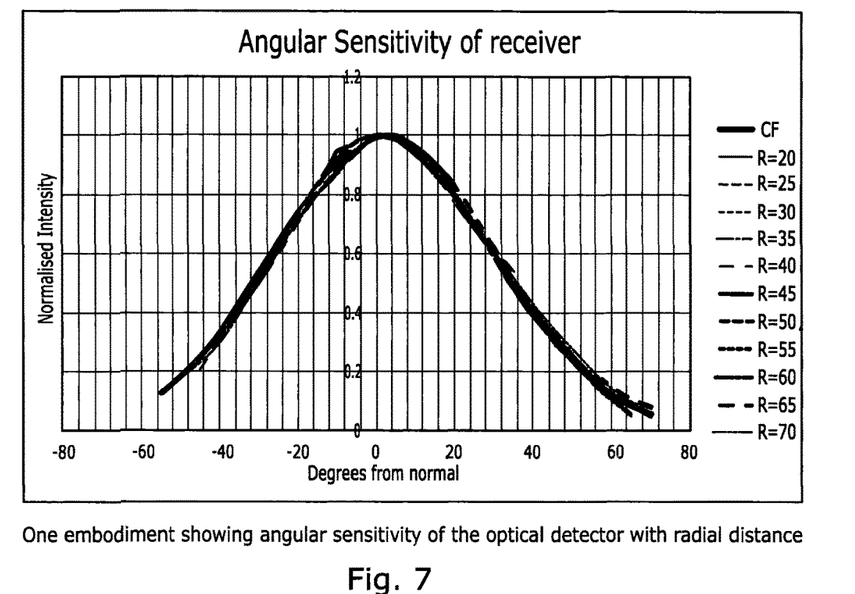
FIG. 7 is a graphical representation of angular sensitivity of an optical sensor with radial distance.

In FIG. 7, the angular sensitivity of one embodiment used in this invention is shown, but the present invention is in no way intended to be limited thereto.

Thus, when determining the position of press, the algorithm has to take into account not just the hyperbolic intersection of lines of constant difference in distance between pairs of sensors, but also the change in angular sensitivity that different solutions present to different sensors.

The manner in which this is achieved in the present exemplary embodiment will now be described in more detail, but as discussed previously, to one skilled in the art, other methods of solving these simultaneous equations for example using matrices, will become apparent.

Refining press position accounting for angular sensitivity of the optical sensors:

Depending upon the shape/nature of the sensors, reflectors and or optics, they will exhibit some degree of variation in response to the angle of light incident upon them. This angular variation in light intensity still needs to be accounted for if this correct touch position is to be calculated.

It will be recognised that this refinement in calculating the position of the touch, taking into account the angular sensitivity of the optical sensors, is a supplement to the algorithm described above, which at first approximation assumes constant angular sensitivity of the sensors.

The approach taken for one embodiment, though not limited thereto, is the use of an iterative calculation based upon the algorithm described above.

In the first instance the centre of the plate can be used as an initial estimated location, or an initial estimate can be made based upon the relative sensor signal levels and their known locations.

Using this initial estimated touch location, the sensor levels to be used by the above-described algorithm can be individually adjusted to account for the variation in responsivity with the angle of the estimated touch location with respect to the normal for each sensor.

The sensor selection and adjusted intensity levels for each sensor is then used by the above-described algorithm and the algorithm run for a first time.

The algorithm will, as described above, return an average touch location, based on the average intercept point of information from a number of prioritised sensors, which in this exemplary embodiment may be 5 sensors, though not restricted thereto.

This new estimated touch location will be closer to the actual touch location than the original estimate.

This new estimated location is then used again to account for the angular sensitivity of each sensor and adjust the values of intensity used for each sensor in the algorithm described above.

The algorithm described above is run for a second time and a refined touch location derived.

This iterative approach can be repeated until the touch position calculated gets closer to the true position, each time the error getting smaller and smaller.

In order to establish if a press location has been determined to an acceptable level of accuracy, at the end of each run of the algorithm a simple test is performed, which is to determine the average variation in distance of each of the intercept points obtained for each independent pairs of lines used in the above-described algorithm.

By setting an appropriate threshold level for the required level of press location accuracy it is therefore possible to find when the algorithm has determined the exact press location to the required accuracy.

Thus, in accordance with aspects of the present invention, there is provided a touch sensitive screen arrangement comprising a screen including an optically lossy base plate, being relatively transparent in the vertical direction, but lossy in the lateral direction and configured to scatter and so dissipate and disperse light incident on a surface thereof, the arrangement further comprising a means of transmitting light onto said plate in response to an external body touching said screen at a touch point, the position on said base plate at which said light is incident being representative of a the relative position of said touch point, photo detection means located at an edge of said base plate for detecting light dispersed thereby, and processing means for calculating the relative position of said touch point from said detected light and generating a control signal representative of a control input derived from said position of said touch point.

Multiple touch functionality, may be achieved by either calculating simultaneous touch locations alone or using a combination of single location determination and a sequence of touches. For example, multi-touch functionality can be provided by detecting the changes in light levels associated with multiple single touches separated in time, but which are associated with a single action: a first touch is identified and detected and, whilst that touch remains in place, a second touch is added, which further changes the light levels and can therefore be detected. If the first touch remains constant, changes caused by movement of the second touch can be actioned. A device driver (not shown) will then be able to interpret the resultant data as a touch-based input, such as a key press or scroll action.

In a preferred embodiment, a plurality of photo diodes are used to detect light incident on, and dispersed by, the bottom plate.

The present invention thus provides a means of producing a relatively low-cost, reliable touch screen, which can be adapted to single or multi-touch screen applications, as required, and is also relatively easily adaptable to curved, flexible or complex shapes or mouldings, as required. The use of modulated visible, modulated infra red or unmodulated infra red light source(s) makes the described technique a robust and flexible one in a variety of lighting conditions. If visible light is to be used, the light will need to be modulated to distinguish it from ambient light. However, if infra red sources are used, these can be modulated or unmodulated as required. However, it is recognised that the ambient lighting noted as an incidental signal in this detection process, and as such this feature may be a useful feature in the system, for example to increase or decrease the background lighting of the display screen.

In addition, by uniquely modulating each light source, or groups of light sources, in frequency, phase or code, an enhanced detection system may be achieved. For example, to resolve the location of a press, it is possible to determine which light source the press was closest to, if one light source is modulated at a frequency with 0 degrees phase shift and the other is relatively phase shifted by, for example, 90 degrees. Other modulation schemes are also possible, in order to achieve various other enhancements, as will be apparent to a person skilled in the art.

A further feature of the described system is its ability to self-calibrate alignment between display screen and touch detection, by using a series of bright areas on the display screen, at known locations, and then correlate these with the locations of the bright areas as detected by the photo detectors. For this purpose, low frequency modulated "dots" of light can be used, or even DC light can be used in the dark (so that ambient light does not interfere with the calibration process).

A further feature of this system is the manner in which deterioration of the top screen due to scratches or dirt or grease, is compensated.

Figure 11:
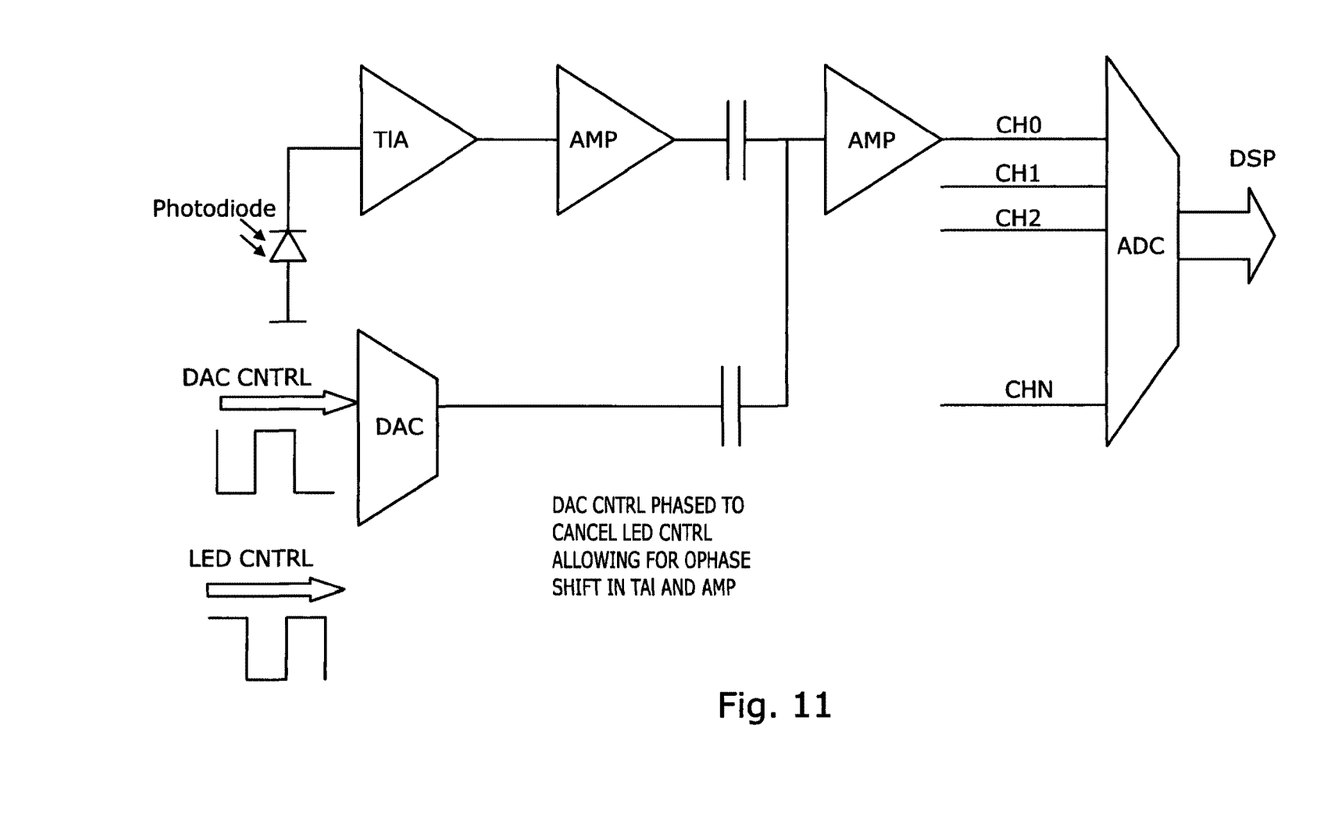
FIG. 11 is a schematic diagram illustrating a technique for maintaining the dynamic range of the electronic signal processing path, despite an increased level of background signal caused by deterioration of the top screen

Since the top screen is subject to the environment, it may become scratched and or pick up dirt or grease, which will inject some light into the bottom plate. This in its own right is not an issue for the touch detection approach envisaged, which uses changes in the light intensity to determine a touch. However, an increasing amount or scratches and or dirt and grease on the top screen does increase the background light intensity seen in the bottom plate over the long time period and therefore reduces the dynamic range available to the electronic signal processing path associated with each photodiode channel A novel solution for solving this issue is to inject into the electronic signal path(s) at an appropriate point a compensation signal(s) substantially in antiphase to the signal driving the lights, (allowing appropriately for any additional phase shift in the signal processing path). The amplitude of this compensation signal(s) can be automatically be controlled over a long time period, so allowing for any gradual deterioration of the top screen. An example of this implementation is illustrated schematically in FIG. 11 of the drawings.

Figure 2:
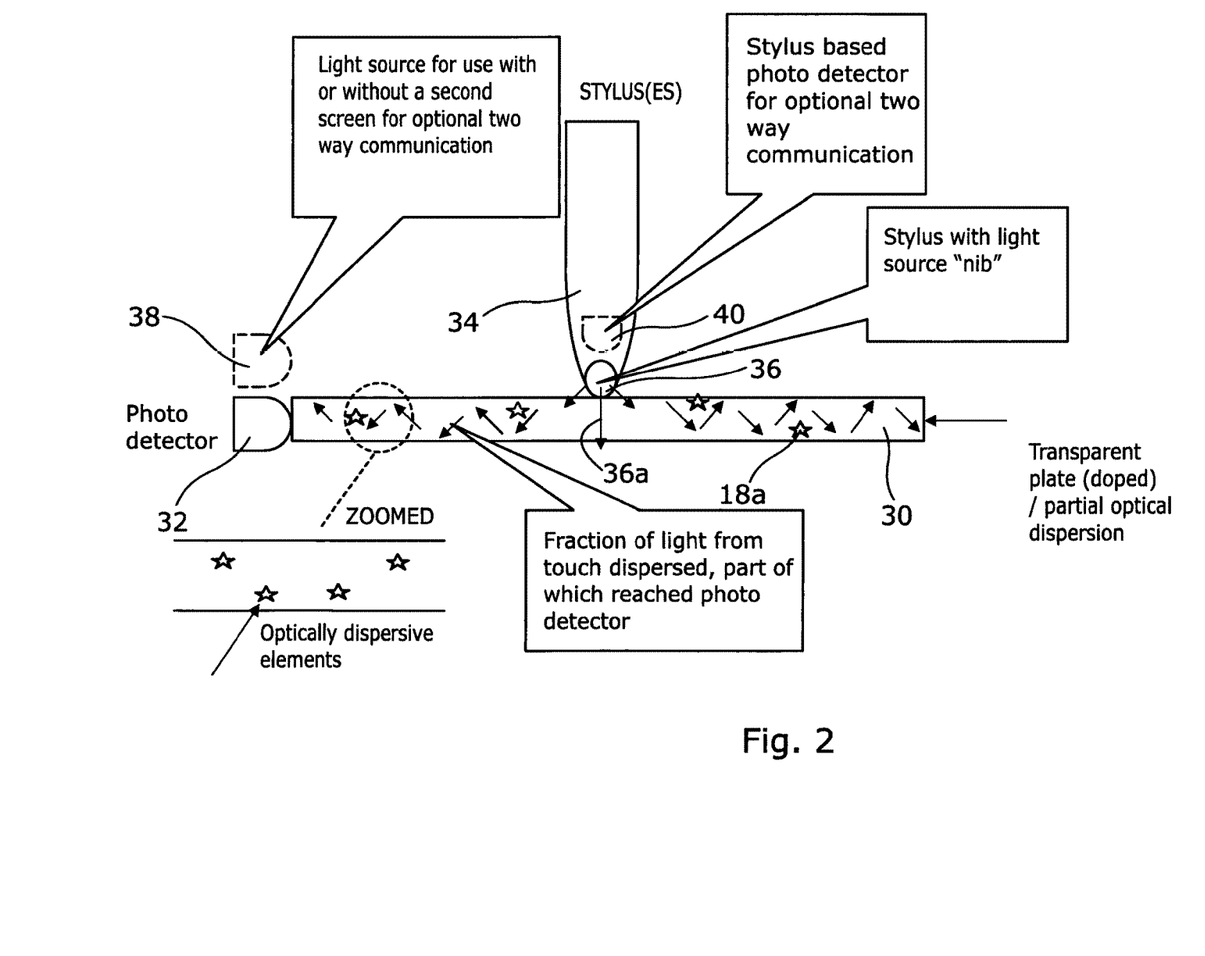
FIG. 2 is a schematic cross-sectional view of a touch screen arrangement according to a second exemplary embodiment of the present invention.

Referring to FIG. 2 of the drawings, a touch screen arrangement according to a second exemplary embodiment of the present invention comprises an optically dispersive and lossy bottom plate 30 and one or more photo detectors 32 located at respective edges thereof. The bottom plate 30 has a dispersive property which causes light incident thereon from above to be dispersed towards its edges, in such a manner as to form a dominantly lossy plate. Once again, such dispersive property can be achieved in a number of different ways, as will be apparent to a person skilled in the art. For example, the plate 30 may have therein embedded microscopic optically refractive and/or or reflective particles or molecules 18a. Such molecules will cause light incident thereon to be refracted and/or reflected and consequently scattered within the bottom plate 30, and some part lost through the top and bottom surfaces, thereby causing scattering/loss and spreading out of the light across the plate 30 toward the edges, such that it can be detected by the photo detector 32.

A stylus 34 is provided, which includes a light source 36a in or at the "nib" 36 thereof. When the stylus nib 36 including the light source 36a touches, or is directed towards, the plate 30, light from the light source 36a is transmitted into, or coupled into, the plate 30 and its dispersive properties cause light incident thereon to be dispersed through the plate 30 toward the edges, such that at least part of said light is detected by the photo detector 32. It will be appreciated that the location on the plate 30 at which the stylus is touched will determine the distance of the incident light from the edges of the plate 30 (i.e. the distance over which the light needs to be dispersed to reach the photo detector edge). As a result, the amount of light detected by the photo detector 32 will be entirely dependent on the location at which the plate 30 is touched, and the intensity of the light emitted from the stylus.

It will be appreciated that the scattering/dispersive property of the bottom plate increases the amount of light captured by the plate and also the manner in which it is dispersed and attenuated in the lateral direction. Thus, this property may be used to control the behaviour of the attenuation of the captured light with distance from the originating touch, so that the location of the touch point can be uniquely calculated, and accuracy of the position of touch controlled. It is also possible to control the profile of the attenuated captured light with distance by controlling the profile of the concentration of the scattering/dispersive material embedded in the bottom plate 30.

In any event, once again, processing means (not shown) are provided for receiving data from the photo detector, representative of the amount and intensity of light detected thereby and, therefore, calculates the location on the top plate 10 of the touch point and the nature of the touch. Thus, by comparison of relative intensity and knowledge of the dispersive and attenuative properties of the bottom plate 18, it is possible to calculate the position and nature of a touch or even multiple touches, as described above. A device driver (not shown) will then be able to interpret the resultant data as a touch-based input, such as a key press or scroll action.

In a preferred embodiment, a plurality of photo diodes may once again be used to detect light incident on, and dispersed and attenuated by, the bottom plate.

Referring again to FIG. 2 of the drawings, the arrangement may optionally comprise a further light source 38 which can be modulated to represent data. In this case, the stylus 34 may further include a photo detector 40 for capturing modulated light signals from said light source 38, to enable two-way communication between the stylus and the host computing device. In this case, an optically transparent top plate (not shown) may be provided above the bottom plate 30, with an air gap therebetween, as in the embodiment described with reference to FIG. 1 of the drawings. In this case, the angle of incidence of light from the light source 38 is preferably configured to cause total internal reflection of the light in the top plate, as in the previously described embodiments.

It will be apparent that multiple styluses may be used, with or without unique identification (i.e. modulation of their respective light sources), and with or without geometric relationships between them. In addition, a stylus may have more than one light source, geometrically configured, so that the orientation of the stylus may be detected. A stylus in this embodiment may be any configuration of light source and photodetector. It need not be in the conventional pen shape, but may comprise any suitable shape, or may be incorporated into another object or device, and may even comprise another screen.

Figure 3:
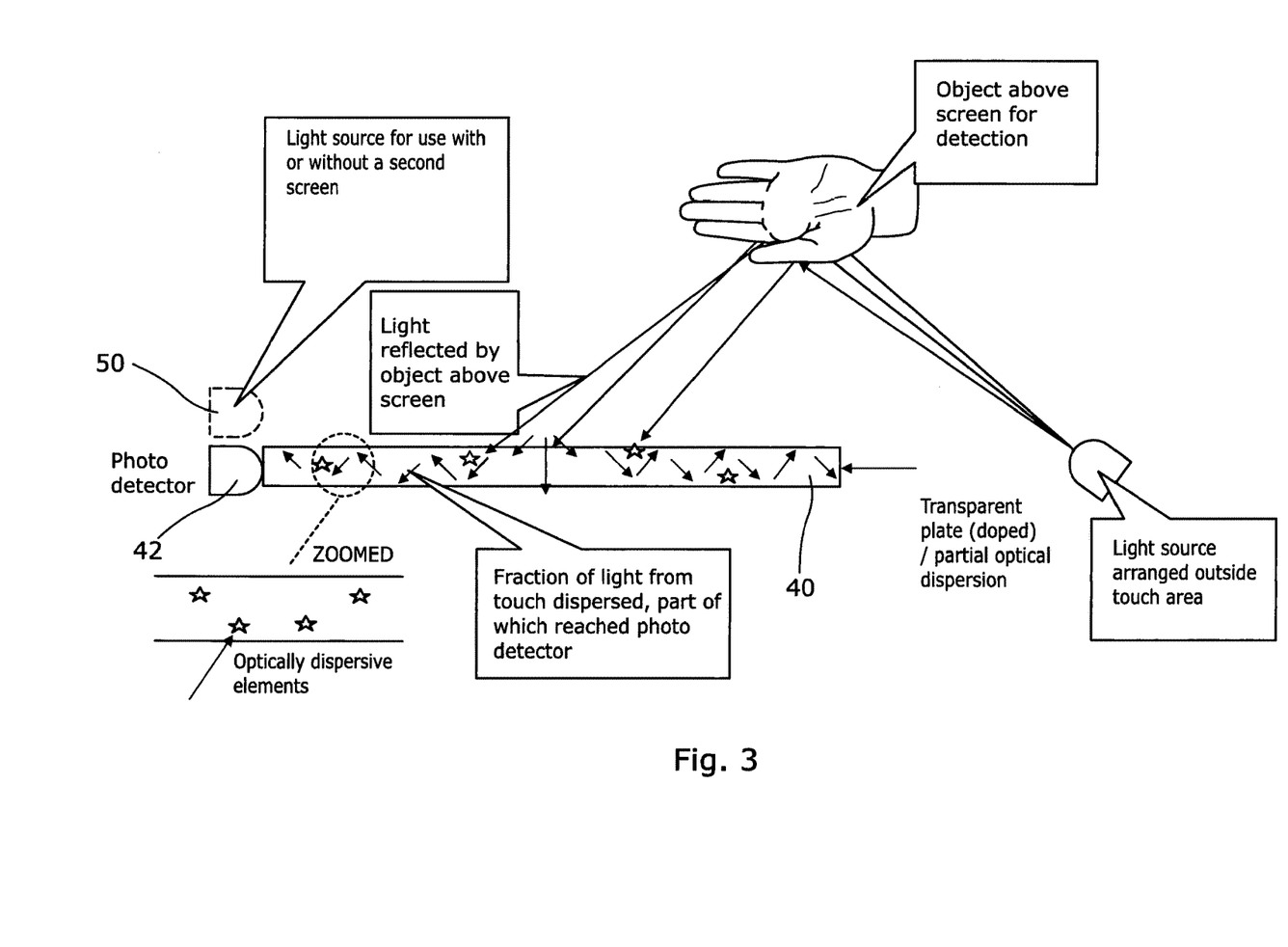
FIG. 3 is a schematic cross-sectional view of a touch screen arrangement according to a third exemplary embodiment of the present invention.

Referring to FIG. 3 of the drawings, a touch screen arrangement according to a third exemplary embodiment of the present invention comprises an optically transparent bottom plate 40 and a photo detector or photodetectors 42 located at a respective edge(s) thereof. One or more light sources 50 are provided externally of the screen, and angled such that an object, such as a hand, passing above the touch screen area, reflects light down onto the bottom plate 40. In this manner, gestures such as a hand wave (for example, to indicate a command) can be recognised. This configuration is particularly suited to the detection of gross "sweeping" actions, such as might be representative of turning the pages of a book, or the like. However, it will be appreciated that the arrangement shown in FIG. 3 can be further enhanced by the provision of a top plate, such as that provided in the embodiments described with reference to FIG. 1, to give enhanced capability of detecting a finger or stylus touch, as well as recognising other gestures.

It will be apparent to a person skilled in the art that modifications and variations can be made to the described embodiments without departing from the scope of the invention as claimed.

The invention claimed is:

1. A touch sensitive screen arrangement comprising a screen including an optically dispersive base plate, and means for transmitting light onto and into said base plate in response to an external body touching said screen at a touch point such that the location of incident light on the surface of said base plate is representative of the relative position of said touch point on said screen, wherein said base plate is configured to capture and transmit within the base plate light incident thereon and disperse said transmitted light by spreading and energy loss, the optically dispersive characteristic of said base plate being such that the decrease in intensity of said transmitted light with distance from said location of incidence on said base plate surface approximates a substantially exponential function, the arrangement further comprising at least one sensor for detecting intensity of light transmitted out of the base plate at a respective edge of said base plate, and processing means for calculating the relative position of said touch point on said screen from said detected light intensity and said exponential function and generating a control signal representative of a control input derived from said position of said touch point;

wherein said base plate comprises an optically transparent substrate doped with optically refractive and reflective particles or molecules; and wherein the gradient of said exponential function is dependent on the level of doping of said base plate with said optically refractive and reflective particles or molecules.

2. The touch sensitive screen arrangement according to claim 1, comprising at least two sensors for detecting intensity of light at respective edges of said base plate, and the optically dispersive characteristic of said base plate is such that the intensity ratio of light detected by said sensors approximates a substantially exponential function including an element representative of the difference between the respective distances of said sensors from said location of incidence of light on said base plate surface.

3. The touch sensitive screen arrangement according to claim 2, wherein said optically dispersive characteristic of said base plate is such that said intensity ratio is defined by a substantially constant difference in respective distances of said sensors from said location of incidence of light on said base plate surface, irrespective of the relative position of said touch point.

4. The touch sensitive screen arrangement according to claim 1, wherein said processing means is configured to adjust said relative position calculation to take into account angular sensitivity of said sensor(s).

5. The touch sensitive screen arrangement according to claim 1, wherein said screen further comprises an optically transparent top plate, spaced apart from said base plate with a substance therebetween, and the arrangement further comprises a light source configured to illuminate said top plate such that said illuminating light is substantially totally internally reflected within said top plate when no external body is touching said screen.

6. The touch sensitive screen arrangement according to claim 5, wherein the refractive index of the substance between the top plate and the base plate is less than the refractive index of the optically dispersive top plate.

7. The touch sensitive screen arrangement according to claim 6, wherein said substance between said top plate and said base plate is air.

8. The touch sensitive screen arrangement according to claim 5, wherein said light source is located at an edge of said top plate and configured to illuminating said top plate with a ray of light at a predetermined angle of incidence, wherein said angle of incidence and the refractive indices of said top plate and the substance between said top plate and said base plate are such that said illuminating light is substantially totally internally reflected within said top plate when no external body is touching the screen.

9. The touch sensitive screen arrangement according to claim 1, further comprising a stylus including a light source at an end thereof and configured to transmit light from said light source to said base plate at a touch point on said screen.

10. The touch sensitive screen arrangement according to claim 9, wherein said screen further includes an optically transparent top plate, spaced apart from said base plate with a substance therebetween, and the arrangement further comprises a light source configured to illuminate said top plate with a modulated optical signal.

11. The touch sensitive screen arrangement according to claim 10, wherein said stylus includes a photo detector for detecting said modulated optical signal, thereby enabling two-way communication between said stylus and said screen.

12. The touch sensitive screen arrangement according to claim 1, wherein said processing means is configured to calculate said relative position of said touch point using a hyperbolic intersection algorithm.

13. The touch sensitive screen arrangement according to claim 5, wherein said processing means is configured to compensate for loss of dynamic range in the path of said detected light intensity signals due to deterioration of said top screen.

* * * * *